United States Patent

Ley et al.

[11] 3,845,388
[45] Oct. 29, 1974

[54] RMS CONVERTER

[75] Inventors: Anthony John Ley, Farnham; Howard Anthony Dorey, Godalming, both of England

[73] Assignee: The Solartron Electronic Group Limited, Farnborough, Hampshire, England

[22] Filed: July 30, 1973

[21] Appl. No.: 383,848

[30] Foreign Application Priority Data
Aug. 19, 1972   Great Britain .................. 38789/72

[52] U.S. Cl. .............. 324/106, 324/99 D, 324/132, 328/144
[51] Int. Cl. ....................... G01r 5/22, G01r 15/10
[58] Field of Search .......... 324/106, 95, 99 R, 99 D, 324/132; 321/1.5; 328/144

[56] References Cited
UNITED STATES PATENTS

| | | | |
|---|---|---|---|
| 3,048,778 | 8/1962 | Rumpel | 324/95 |
| 3,435,319 | 3/1969 | Richman | 321/1.5 |
| 3,488,482 | 1/1970 | Ley | 235/183 |

FOREIGN PATENTS OR APPLICATIONS

| | | |
|---|---|---|
| 1,050,145 | 12/1966 | Great Britain |
| 1,430,753 | 1/1966 | France |

OTHER PUBLICATIONS
Hewlett–Packard Catalog, No. 24, 1963, Hewlett–Packard Co., Palo Alto, Calif., pgs. 1a, 1b, 194, 195, 200, 201.
Zach, W., "Rechengerat mit Digitaler...", Revue CH Landis & Gyr Mitteilungen..., 1970, No. 9, pages 6-10.

*Primary Examiner*—Alfred E. Smith
*Assistant Examiner*—Ernest F. Karlsen
*Attorney, Agent, or Firm*—Roylance, Abrams, Berdo & Kaul

[57] ABSTRACT

An RMS converter for measuring the RMS value of an input signal. The converter comprises a bridge made up of four identical resistors whose resistance varies approximately linearly with temperature. A first heating element is in thermal contact with the resistors of two electrically-opposed arms of the bridge and is arranged to receive the input signal to be measured. A second identical heating element is in thermal contact with the resistors of the other two electrically-opposed arms of the bridge. An integrator is connected to receive the voltage across the output diagonal of the bridge and is adapted to produce the time integral of the bridge output voltage divided by time. The output of this integrator is connected to the second heating element. Means are provided for supplying the supply diagonal of the bridge with a voltage that is inversely proportional to the output voltage of the integrator, whereby the output voltage of the integrator represents the RMS value of the input signal.

7 Claims, 1 Drawing Figure

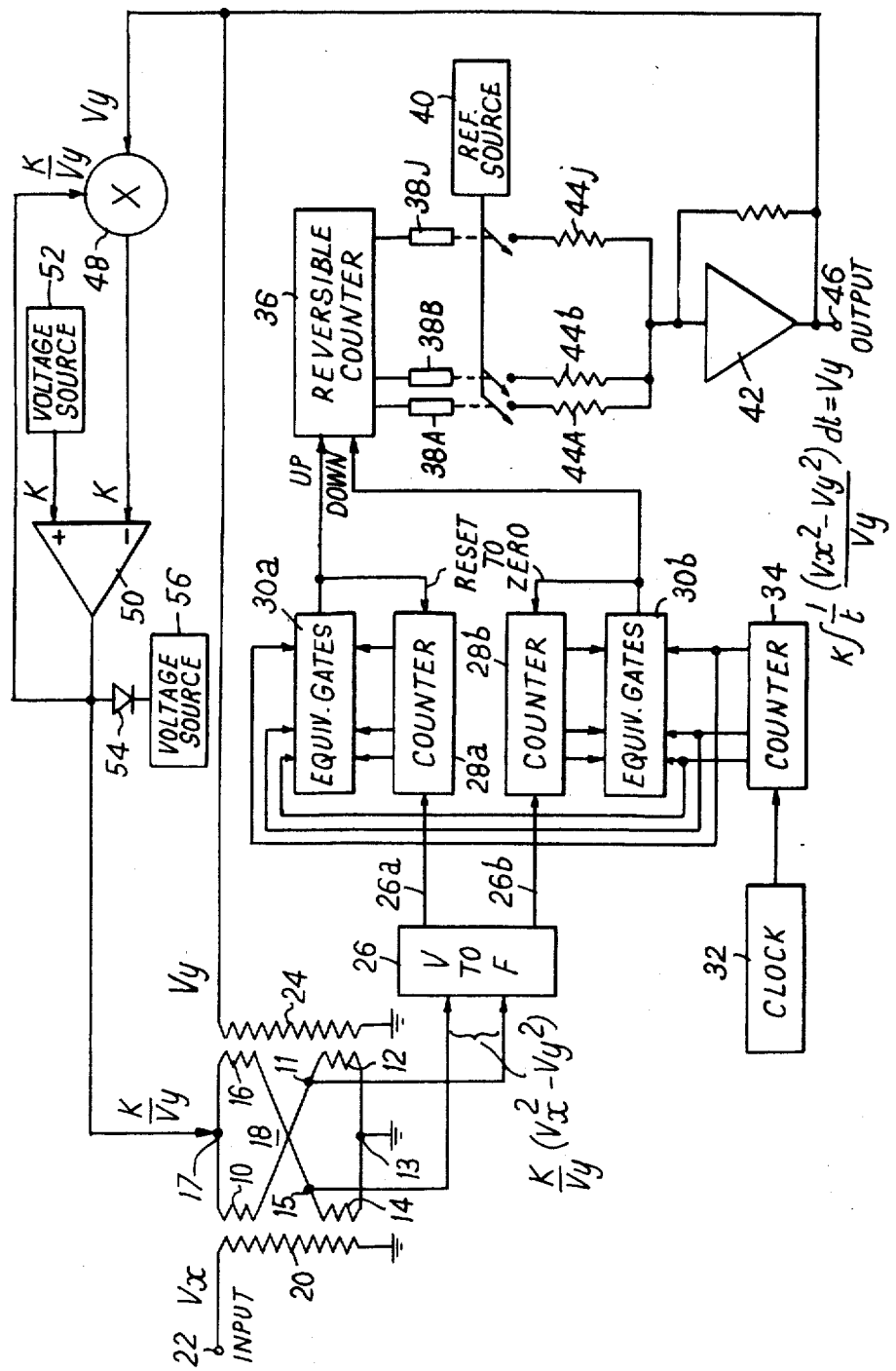

RMS CONVERTER

This invention relates to RMS converters, that is to say, to devices for measuring the RMS (root-mean-square) value of an electrical signal, which is the parameter defined by the expression $$\sqrt{\frac{1}{T}\int_0^T x^2(t)dt},$$

T being the integration time and $x(t)$ the waveform of the signal. Such a parameter, which describes the total energy content of a signal, is often used for characterising signals of unknown waveforms and, in particular, complex or random waveforms.

A known RMS converter comprises a bridge, the four arms of which are constituted by two resistors and the collector-emitter junctions of two bipolar transistors used as temperature sensors. The signal to be measured is applied across a resistor heater which heats one of the transistors, unbalancing the bridge. A differential amplifier detects this unbalance and applies a DC voltage across another resistor heater which heats the second transistor to the same temperature as that of the first transistor and thus re-establishes the balance of the bridge. In this condition, the DC voltage developed by the differential amplifier represents the RMS value of the input signal.

Such a circuit has good accuracy and a wide frequency range. Nevertheless, its settling time is relatively long and this constitutes a considerable disadvantage, in particular when the circuit is to be used in an automatic measurement system. It is an object of the present invention to palliate this disadvantage.

According to this invention, there is provided a device for measuring the RMS value of an input signal, comprising a bridge of which at least two adjacent arms on opposite sides of the supply diagonal of the bridge each comprise a resistive temperature sensor whose resistance varies approximately linearly with temperature, a first heating element in thermal contact with one of these resistive temperature sensors and intended to receive the said input signal to be measured, a second heating element substantially identical to the first one and in thermal contact with the other resistive temperature sensor, integrating means connected to receive the voltage across the output diagonal of the bridge and adapted to produce the time integral of the bridge output voltage divided by time, the second heating element being connected to the output of the said integrating means, and supply means for establishing across the supply diagonal of the bridge a voltage inversely proportional to the output voltage of the integrating means, whereby the output voltage of the integrating means represents the RMS value of the input signal.

Conveniently resistors, for example thick film or thin film resistors, can be used as the temperature sensors, for the variation in the resistance of resistors with temperature is sufficiently linear for the purposes of this invention.

Advantageously all four arms of the bridge comprise such a temperature sensitive resistor, preferably all identical, with the first heating element being in thermal contact with the resistors of two electrically-opposed arms of the bridge and the second heating element being in thermal contact with the resistors of the other two electrically opposed arms.

Preferably, the integrating means comprise a voltage-to-frequency converter connected to receive the voltage representative of the unbalance of the bridge and producing pulses — identified with the polarity (positive or negative) of the bridge unbalance voltage — the frequency of which is proportional to this unbalance voltage, dividing means connected to the output of the voltage-to-frequency converter for dividing the frequency of the pulses by an amount which increases linearly with time, and pulse counter means connected to the output of the dividing means for counting algebraically (i.e., having regard to sign) the time divided pulses associated with positive and/or negative bridge unbalance voltage, whereby the count in the pulse counter means varies as the time integral of the bridge unbalance voltage divided by time, and a digital-to-analogue converter connected to the output of the pulse counter means for converting the digital representation of the pulse counter means into analogue form.

The dividing means may comprise two division circuits - one for the pulses associated with positive bridge unbalance voltage and the other for the pulses associated with negative bridge unbalance voltage. Each division circuit can be constituted by a first pulse counter connected to the corresponding output of the voltage-to-frequency converter, a second pulse counter (which may be common to the two division circuits), identical to the first one and connected to the output of a clock pulse generator, and a comparison circuit connected between these two counters and producing an output pulse when they contain the same count, this pulse being used to reset the first counter and increment the previously-mentioned pulse counter means up (positive unbalance) or down (negative unbalance).

According to a preferred embodiment of the invention the supply means comprise a multiplier circuit one input of which is connected to the output of the digital-to-analogue converter and a differential amplifier the inverting input of which is connected to the output of the multiplier circuit, the non-inverting input to a voltage source and the output to the other input of the multiplier circuit, whereby the output voltage of this amplifier, which is the supply voltage of the bridge, represents the ratio of the output voltage of the said source to the output voltage of the digital-to-analogue converter.

The invention will now be described in more detail, by way of an example only, with reference to the accompanying drawing which is a block diagram of one embodiment of a device according to the invention.

In the drawing, four identical resistors 10, 12, 14 and 16 are connected to form the four arms of a resistive bridge 18. The two electrically opposed resistors 10 and 14 are in thermal contact with a resistor heater 20 connected between earth and an input terminal 22. The other two resistors 12 and 16 are in thermal contact with a resistor heater 24 identical to the resistor heater 20. The common junction 11 of the resistors 10 and 12, on the one hand, and the common junction 15 of the resistors 14 and 16, on the other hand, which form the ends of the output diagonal of the bridge 18, are connected to the input of a voltage-to-frequency converter 26 which produces a train of output pulses the frequency of which is proportional to the voltage between its two inputs. These output pulses appear on a line 26a when the voltage applied to the v to f converter 26 is positive, i.e., when the voltage at the junction 15 is higher than the voltage at the junction 11, and on a line 26b when this applied voltage is negative. The pulses on lines 26a and 26b are applied to binary counters 28a and 28b respectively. The output from each stages of the counter 28a is connected to a comparison circuit 30a, and similarly the output from each stage of 28b is connected to a comparison circuit 30b. The comparison circuits 30a and 30b each comprise a plurality of equivalence gates.

A clock pulse generator 32 is connected to another binary counter 34, identical to the counters 28a and 28b, and the output from each stage of this counter 34 is also connected to the comparison circuits 30a and 30b. Every time the circuit 30a detects that the counters 28a and 34 have the same count, it delivers a pulse which is applied, on the one hand, to the reset input of the counter 28a and, on the other hand, to the "count-up" input of a reversible 10-stage binary counter 36. Similarly, every time the circuit 30b detects that the counters 28b and 34 have the same count, it delivers a pulse which is applied, on the one hand, to the reset input of the counter 28b and, on the other hand, to the "count down" input of the reversible counter 36. The output from the stages of this counter 36 are arranged to energize the coils of a series of ten relays 38A, 38B, ... 38J, the relays 38A and 38J being associated with the least significant and most significant stages respectively of the counter 36. Each of these relays connects, when energised, a voltage source 40 to a summing amplifier 42 through one of an array of ten binary weighted resistors 44A, 44B, ... 44J, having the values R, R/2, ... R/512 respectively.

The output of the amplifier 42 is connected, on the one hand, to earth through the resistor heater 24 and, on the other hand, to one input of a multiplier circuit 48, the other input of which is connected to the output of a differential amplifier 50. This amplifier has its non-inverting input connected to a voltage source 52 and its inverting input to the output of the multiplier circuit 48. The output of the amplifier 50 is connected to the common junction 17 of the resistors 10 and 16 of the bridge, the common junction 13 of the resistors 12 and 14 being earthed; thus the output voltage of the amplifier 50 is applied across the supply diagonal 13–17 of the bridge. The output of the amplifier 50 is also connected through a clamping diode 54, in the forward direction of this diode, to a voltage source 56.

The output of the amplifier 42 is provided with a terminal 46 which forms the output terminal of the device and furnishes the output information in analogue form. Alternatively, if a digital output is desired, it can be taken directly from the reversible counter 36, which contains the same information but in digital form.

The operation of the described device will now be explained. When no AC voltage is applied to the input terminal 22, no power is dissipated in the resistor heater 20 and the bridge 18 is balanced. As no voltage is applied to the converter 26, no pulses appear at its outputs and the output terminal 46 is at zero. The output of the amplifier 50, which would tend to go infinite when the voltage at 46 is zero, is clamped by the diode 54 to the voltage of the source 56.

When an AC voltage $V_x$ is applied to the input terminal 22, it heats the resistor 20, which, in turn, heats the resistors 10 and 14, raising the potential of the junction 15 and lowering the potential of the junction 11, thereby unbalancing the bridge 18. The converter 26 then produces a train of pulses on its output 26a (corresponding to a positive unbalance), the frequency of which is proportional to this unbalance. The counter 28a is thus incremented by these pulses, whereas the counter 34 is incremented by the pulses from the clock 32 which was started at the same time as $V_x$ was first applied to the input terminal 22. If the bridge unbalance becomes negative, i.e., if the potential of the junction 11 becomes higher than the potential of the junction 15, the output pulses from the converter 26 appear at 26b and are counted by the counter 28b.

Assuming that the frequency of the output pulses of the converter 26 is higher than that of the clock 32 (a few Hz), it can be seen that the frequency of these pulses will be linearly divided by time. As the counter 28a or 28b runs faster than the counter 34 which is not reset to zero and the comparison circuit 30a or 30b resets its corresponding counter 28a or 28b to zero every time this counter catches up to the counter 34, the time interval taken by the counter 28a or 28b to catch up with the counter 34 increases with time. Thus, since the count of the counter 34 increases linearly with time, the frequency of the pulses fed into the counter 36 is that of the output pulses of the converter 26 linearly divided by time. The reversible counter 36, with its "count up" input corrected to the comparison circuit 30a and its "count down" input connected to the comparison circuit 30b, takes into account changes in the polarity of the voltage across the output diagonal 11–15 of the bridge 18.

If the frequency of the output pulses of the converter 26 is lower than that of the clock 32, the counter 28 cannot catch up to the counter 34, so that no pulse is applied to the counter 36. Thus, the frequency of the clock pulses defines the threshold below which the unbalance of the bridge 18 is not taken into account, for it is considered as negligible.

Considering now the counter 36, its count varies as the time integral of the voltage unbalance of the bridge divided by time. The conversion of this digital information into an analogue voltage is accomplished by varying, according to the count contained by this counter, the value of the resistance between the voltage source 40 and the amplifier 42. More precisely, the first pulse applied to the counter 36 energizes the relay 38A which connects the source 40 to the amplifier 42 through the resistor 44A, of value R. The second pulse applied energizes the relay 38B which, in turn, connects the source to the amplifier through the resistor 44B, of value R/2. The third pulse will energize the relays 38A and 38B, so that the connection will be achieved by the resistors 44A and 44B in parallel, of value R/3; the fourth pulse will energize the relay 38C and the connection will be achieved by the resistor 44C, of value R/4, and so on. Thus, when the counter 36 contains the count 1, the voltage $V_u$ at the output terminal is v; when the counter contains the count 2, this voltage is 2v, ... and when the counter contains the count n, this voltage is nv. Under these conditions, the voltage $V_u$ varies as the time integral of the voltage unbalance of the bridge divided by time.

The voltage $V_u$ is, on the one hand, converted into heat in the resistor 24 which heats the resistors 12 and 16 of the bridge, in order to progressively re-establish the balance and, on the other hand, applied to the multiplier circuit 48 which, by conjugating its actions with that of the amplifier 50, supplies the bridge 18 with a DC voltage of value $K/V_u$, K being the value of the voltage produced by the source 52. It can be demonstrated that, when the bridge is again balanced (i.e., when the count of the counter 36 does not increase any more and, thus, when the voltage $V_u$ has a steady value), $V_u$ represents the RMS value of the voltage $V_x$ applied to the input terminal 22.

Assuming that the resistance of the four resistors 10, 12, 14, 16 of the bridge increases linearly with temperature (an assumption that is sufficiently true for the purposes of this invention), the voltage applied to the converter 26 is given by the expression $$K/V_u (V_x^2 - V_u^2),$$

and the output voltage $V_u$ is:

$$V_u = K \int (V_x^2 - V_u^2) \, dt/V_{u,t}$$

But then:

$$dV_u/dt = K \, V_x^2 - V_u^2/V_{u,t}$$

Rearranging:

$$t \, dV_u \, V_u/dt + KV_u^2 = KV_x^2$$

and integrating, with $K = \frac{1}{2}$ $$V_y^2 t = \int V_x^2 \, dt$$

or $$V_y = \sqrt{\frac{1}{t} \int V_x^2 \, dt}$$

Thus the voltage $V_u$ at the output terminal 46 is effectively the RMS value of the input voltage $V_x$.

Owing to the use of a resistive bridge the four branches of which are in thermal contact with the resistor heaters, the device in accordance with the present invention has a very small thermal time constant, so that its settling time is limited only by the time constant of the electrical circuit. Thus, according to the frequency spectrum of the input signals, the device has two modes of operation with a smooth transition between them. These modes will be described with reference to a single frequency pure sine wave input, for the sake of simplicity. For input signals whose period is small compared to the thermal time constant of the bridge, the voltage representative of the unbalance, which is applied to the converter 26, is practically DC and reaches almost immediately its maximum value, so that the time taken by $V_u$ to restore the balance of the bridge is very short. Thus, the settling time of the circuit in this mode is very small and $V_u$ reaches its steady-state value after a time which is not very different from the thermal time constant of the bridge.

For sine wave input signals whose period is comparable to or larger than the thermal time constant of the bridge, the voltage representative of the unbalance is oscillatory and its period of oscillation is the same as the period of the input signal. In this mode, the integration time needed to restore the balance of the bridge is longer and thus $V_u$ reaches its steady-state value after a time which increases as a function of the period of the input signal. Only in this mode is the full effect and advantage felt of controlling the input voltage to the bridge to be equal to $K/V_u$.

Thus the device in accordance with this invention measures the RMS value of AC signals with a settling time which depends on the frequency of these signals, this settling time being very short for high frequency signals and increasing when the frequency decreases.

Although in the preferred embodiment described by way of example four identical resistors are used in the four arms of the bridge, it is not essential that these resistors be identical. It is sufficient that the ratio of the two resistors on one side of the supply diagonal of the bridge be the same as the ratio of the two resistors on the other side of the supply diagonal. Moreover it is not necessary to heat all four of the resistors. It is possible to heat just two of the resistors (with $V_x$ and $V_u$ respectively), in which case the two resistors should be adjacent and on opposite sides of the supply diagonal. Furthermore, it is not even necessary to use four resistors for the four arms of the bridge. For example, the bridge can comprise two resistors forming adjacent arms on opposite sides of the supply diagonal and two constant current sources forming the other two arms.

We claim:

1. A device for measuring the RMS value of an input signal comprising
    a bridge circuit having
        supply terminals at two corners thereof,
        output terminals at the opposite corners thereof and
        a resistive temperature sensor in each of two arms adjacent one of said supply terminals, said sensor having a resistance which varies substantially linearly with temperature;
    first heating element means in thermal contact with one of said sensors for receiving the input signal to be measured and for heating said one of said sensors;
    second heating element means having characteristics substantially identical to said first heating means, said second means being in thermal contact with the other one of said sensors for receiving a feedback signal and for heating said other one of said sensors;
    integrating circuit means connected to said output terminals of said bridge for accepting the electrical output signal produced by unbalance of said bridge and for producing an electrical signal representative of the time integral of said output signal divided by time;
    circuit means for feeding the output of said integrating circuit means back to said second heating element means;
    a source of voltage; and
    supply circuit means connected to said source of voltage, to the output of said integrating circuit means and to the supply terminals of said bridge for providing to said bridge a supply voltage which is inversely proportional to the output voltage of said integrating means, whereby the output voltage of said integrating circuit means has a magnitude representative of the RMS value of the input signal.

2. A device according to claim 1 in which said temperature sensors are resistors.

3. A device according to claim 2 in which each of the four arms of said bridge comprises such a temperature sensitive resistor, all substantially identical, with said first heating element means being in thermal contact with the resistors of two electrically-opposed arms of the bridge and the second heating element being in thermal contact with the resistors of the other two electrically-opposed arms.

4. A device according to claim 2, in which the integrating means comprises a voltage-to-frequency converter connected to receive the voltage representative of the unbalance of the bridge and adapted to produce pulses representative of the polarity (positive or negative) of the bridge unbalance voltage, the frequency of said pulses being proportional to said unbalance voltage;

dividing means connected to the output of said voltage-to-frequency converter for dividing the frequency of the pulses by an amount which increases linearly with time;

and pulse counter means connected to the output of said dividing means for counting algebraically the time divided pulses associated with positive and/or negative bridge unbalance voltage, whereby the count in the pulse counter means varies as the time integral of the bridge unbalance voltage divided by time;

and a digital-to-analogue converter connected to the output of the pulse counter means for converting the digital representation of the pulse counter means into analogue form.

5. A device according to claim 4 in which said dividing means comprises two division circuits, one for the pulses associated with positive bridge unbalance voltage and the other for the pulses associated with negative bridge unbalance voltage.

6. A device according to claim 5 wherein each said division circuit comprises:

a first pulse counter connected to the corresponding output of the voltage-to-frequency converter;

a clock pulse generator;

a second pulse counter identical to said first pulse counter and connected to the output of said clock pulse generator;

and comparison circuit means connected between said first and second pulse counters for producing an output pulse when said counters contain the same count, said output pulse being used to reset said first pulse counter and to increment the previously mentioned pulse counter means up when the bridge unbalance is of positive polarity and down when the bridge unbalance is negative.

7. A device according to claim 2, in which said supply means comprise a multiplier circuit one input of which is connected to the output of the digital-to-analogue converter and a differential amplifier the inverting input of which is connected to the output of the multiplier circuit, the non-inverting input to a voltage source and the output to the other input of the multiplier circuit, whereby the output voltage of this amplifier, which is the supply voltage of the bridge, represents the ratio of the output voltage of the said source to the output voltage of the digital-to-analogue converter.

* * * * *